Patented Sept. 28, 1926.

1,601,323

UNITED STATES PATENT OFFICE.

HERMAN C. REINHOLD AND FRANCIS L. FULTZ, OF LANCASTER, PENNSYLVANIA.

BACTERIAL PREPARATION.

No Drawing.    Application filed July 22, 1925.  Serial No. 45,409.

This invention relates to improvements in chicken feed and feed for other livestock and more particularly to a dry bacterial preparation to be mixed with livestock feed.

Cellulose forms a considerable proportion of many livestock feeds and particularly of chicken feed and its digestion presents an important problem. Cellulose is fermented by a limited number of bacteria belonging principally to the class of bacteria pasteuriana which are for the most part anaerobic. We have found that the digestion of cellulose in the stomach of animals and particularly in the gizzards of chickens and other fowls is due largely to the presence of cellulose-fermenting bacteria having the following characteristics. They are Gram-positive bacilli with slightly swollen centers and a tendency to chain formation. Cultures are best grown on agar and do not grow well in a blood serum. On standing the bacilli tend to become slender and after twenty-four hours show marked spore formation. Ordinary sugars are not fermented and lactose shows but slight gas formation. In the presence of cellulose the fermentation is vigorous with large evolution of gas and the production of a marked acidity to thymol blue.

The organism is not pathogenic and possesses no chromogenic or putrefactive qualities. The fermentation is probably due to the formation of an enzyme by the bacteria which acts as a catalyst in the fermentation of cellulose.

The invention will be described more particularly in the following specific example which describes a method of producing a dry suspension of bacteria in the spore stage which is capable of ready mixture with the various stock feeds and chicken feed and which has excellent keeping qualities. It should be understood, however, that in its broader aspect the invention is not limited to a dry suspension described in the specific example or to the details in producing the same and in general includes stock feeds inoculated with bacterium Pasteurianum whether in the form of a dry suspension or in any other suitable form.

A culture is made from the contents of chickens' gizzards on plain agar and permitted to grow. A sterile culture medium which may advantageously have the following formula:

|                  | Grams. |
|------------------|--------|
| Extract of beef  | 5      |
| Sodium chloride  | 5      |
| Peptone          | 15     |
| Agar agar        | 25     |
| Aqua distille    | 1000   | is inoculated with the culture and placed in shallow pans about 5"x10"x2" in an incubator and kept at 37½° C. for twenty-four hours. When the bacteria are in the spore stage and the culture is substantially uncontaminated, the surface of the culture pan is scraped with a glass slide removing the bacterial growth from the surface. The growth from each pan is added to about 500 c. c. of distilled water to which a quarter of a pound of rock phosphate is added. The phosphate may advantageously be finely ground. The suspension of phosphate and bacteria is then dried by means of warm air at a temperature of about 30° C. The drying may advantageously take place in shallow pans or other receptacles presenting a large surface. After drying, which normally takes from about 8 to 10 hours, the hard mixture is broken up and run through a fine sieve.

Three quarters of a pound of finely ground rock phosphate and one quarter of a pound of cornstarch is then added to each quarter of the inoculated phosphate mixture. The final dry powder contains from 40 to 50 billion bacilli per gram and is capable of keeping almost indefinitely if kept substantially free from moisture.

The dry mixture may be packaged and used for mixing with feed or it may be mixed with feed and the inoculated feed packaged. The proportions may vary somewhat, but I have found that about ½ pound of bacteria mixture to 25 pounds of feed is very satisfactory. In a dry state this feed will keep for many months.

Inoculated feed shows a remarkable effect when fed to chickens which are backward in development and is also effective in maintaining the growth and increasing the size of healthy chickens. Other livestock which consume considerable cellulose in their feed show a considerable improvement when fed with inoculated feed of the present invention. It is necessary to continue the feeding with inoculated feed in order to continue the good results as the bacteria are constantly being destroyed owing to the fact that they are bile soluble and are hence destroyed in the intestines of the animals or fowls.

The dry inoculated feed described in the specific example above constitutes a simple and efficient form for the inoculated feed of the present invention, but it should be understood that other finely divided carriers can be used and salt or other minerals which may be desirable can be added to the finished feed.

In the claims the expression "stock feed" is used to cover feeds which are to be used for animals and also feeds to be used for fowl, such as chickens and the like.

I claim:—

1. A stock feed containing bacteria Pasteuriana in amount sufficient to aid in the digestion of cellulose materials.

2. Stock feed containing bacteria Pasteuriana in the spore stage in amount sufficient to aid in the digestion of cellulose materials.

3. Stock feed containing bacteria Pasteuriana in spore form in suspension, the number of bacteria being about 40 to 50 billion per gram of feed.

4. The process of preparing a bacterial preparation which comprises making a culture from the contents of chickens' gizzards, inoculating a culture medium with such culture, and growing the same therein, and admixing the resulting growth with an absorbent material.

In testimony whereof we affix our signatures.

HERMAN C. REINHOLD.
FRANCIS L. FULTZ.